United States Patent [19]
Hudson

[11] Patent Number: 5,322,103
[45] Date of Patent: Jun. 21, 1994

[54] CONTINUOUS CHAIN SAW LUBRICATING SYSTEM FOR USE IN A TREE DELIMBING AND TOPPING MACHINE

[75] Inventor: Thomas H. Hudson, Hueytown, Ala.

[73] Assignee: Hudson Sales Corporation, Hueytown, Ala.

[21] Appl. No.: 980,258

[22] Filed: Nov. 23, 1992

[51] Int. Cl.⁵ .................. F16N 7/14; A01G 23/08; B27B 17/12
[52] U.S. Cl. .................. 144/2 Z; 30/123.3; 83/169; 144/343; 144/338; 144/3 D; 184/15.1; 184/77.1
[58] Field of Search .................. 401/137, 138, 198; 184/15.1, 26, 27.1; 144/2 Z, 3 D, 34 R, 343; 30/123.3, 123.4, 383; 418/102; 83/169

[56] References Cited

U.S. PATENT DOCUMENTS

| | | | |
|---|---|---|---|
| 3,967,698 | 7/1976 | Smith et al. | 184/27.1 |
| 4,016,956 | 4/1977 | Karlsson | 184/15.1 |
| 4,094,382 | 6/1978 | Lee | 184/15.1 |
| 4,132,289 | 1/1979 | Mäkelä | 184/15,1 |
| 4,355,163 | 10/1982 | Overbury et al. | 73/169 |
| 4,648,486 | 3/1987 | Kayser et al. | 184/15.1 |

*Primary Examiner*—W. Donald Bray
*Attorney, Agent, or Firm*—Veal & Associates

[57] ABSTRACT

A continuous chain saw lubricating system employed in a tree delimbing and topping machine having a plurality of lubricant conduits connected to a piston cylinder which is divided into co-functioning and alternating receiving and discharge chambers by a piston. The designation of the chambers is dependent upon the direction of axial movement of the piston. The discharge chamber is defined by a pressure increase and the receiving chamber is defined by a pressure decrease. The pressure variations are such as to allow lubricant to be either drawn into the receiving chamber or discharged from the discharge chamber through a series of check valves connected to the piston cylinder. The piston is reciprocated by the tree delimbing and topping machine causing lubricant to be continuously supplied to the reciprocating chain saw during its cutting and retraction strokes.

14 Claims, 3 Drawing Sheets

CONTINUOUS CHAIN SAW LUBRICATING SYSTEM FOR USE IN A TREE DELIMBING AND TOPPING MACHINE

FIELD OF THE INVENTION

The present invention relates to the oiling of chain saws and more particularly to the oiling of chain saws utilized in tree delimbing or topping machines. In even greater particularity, the present invention relates to an improved system for continuously lubricating a reciprocating chain saw which is employed in a tree delimbing or topping machine throughout the chain saw's cutting and retracting strokes.

BACKGROUND OF THE INVENTION

Tree delimbing or topping machines typically use radial or reciprocating chain saws mounted thereon for cutting to length or topping off felled trees. Systems and methods for lubricating the tree topping saws during operation are necessarily employed in conjunction therewith. However, these generally known lubrication systems apply a "one-shot" quantity of lubricant, such as oil, to the saw chain before it engages the tree. These systems are usually responsive to the actuation of the saw chain, and normally require a short "re-charge" time before engaging the next tree. Other systems have utilized manual actuation to lubricate the chain saw. A system for continuously lubricating a reciprocating chain saw during or throughout the saw's cutting and retracting strokes is not present in the art.

SUMMARY OF THE PRESENT INVENTION

With the foregoing in mind, the principal object of the present invention is to provide a continuous chain saw lubricating system in a tree delimbing or topping machine that will apply lubrication to the reciprocating chain saw throughout both the cutting and retracting strokes.

Another object of the present invention is to reduce wear on the saw during its operational lifetime, thus reducing the amount of maintenance for its upkeep.

These and other objects are accomplished through the use of a continuous chain saw lubricating system that is operatively responsive to both the cutting and retraction strokes of the chain saw.

The continuous chain saw lubricating system includes a piston cylinder and piston for continuously urging a quantity of lubricant from a lubricant reservoir to the chain saw. The piston cylinder has a cylindrical chamber therein for sealingly encasing the piston. An "L" shaped lever arm, which is connected to the sawing machine, is connected to the piston for continuously reciprocating the piston, the reciprocation operatively responsive to the cutting and retraction strokes of the chain saw.

The cylindrical chamber is divided by the plunger of the piston into co-functioning, alternating receiving and discharge chambers, the designation of the chambers contingent upon the direction of axial displacement of the piston. A pressure increase defines a discharge chamber and a pressure decrease defines a receiving chamber.

The continuous chain saw lubrication system is also comprised of a plurality of lubricant conduits for transporting the lubricant from the lubricant reservoir to the chain saw. The flow of the lubricant within the conduits is regulated by a plurality of check valves that are connected to and in fluid communication with the cylindrical chamber.

The orchestrated activity of the above mentioned elements guarantees continuous flow of lubricant to the chain saw whenever the saw is engaged or retracted.

BRIEF DESCRIPTION OF THE DRAWINGS

The foregoing objects and advantages of the present invention for a continuous chain saw lubricating system in a tree delimbing or topping machine will be more readily understood by one skilled in the art by referring to the following detailed description of a preferred embodiment and to the accompanying drawings which form a part thereof, and wherein.

DETAILED DESCRIPTION OF A PREFERRED EMBODIMENT

Figure 1:
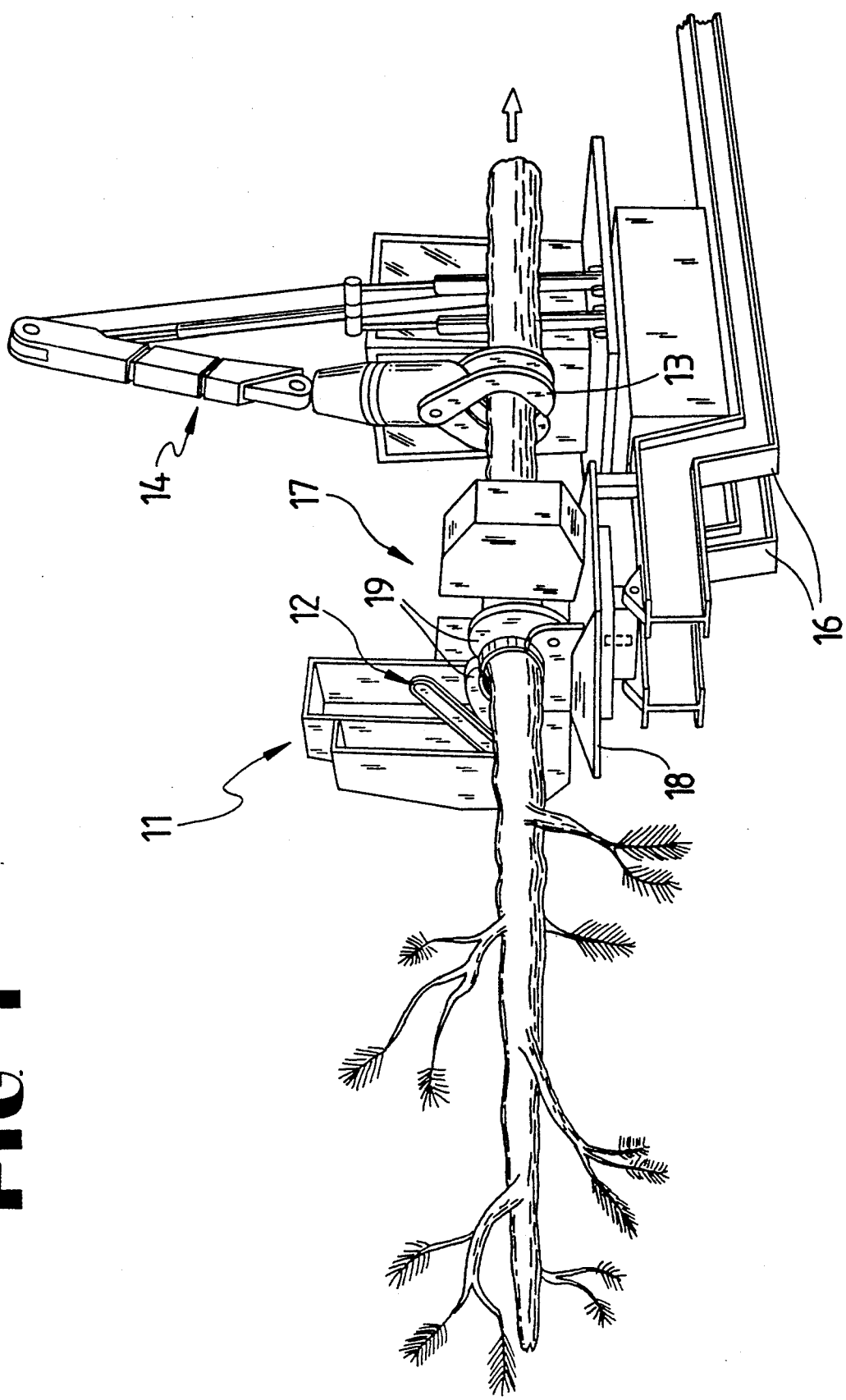
FIG. 1 is a perspective view of a tree delimbing machine in which my invention may be employed.

As shown in FIG. 1, the preferred embodiment of the present invention is designed to be employed in a tree delimbing and topping machine assembly 11 which utilizes a reciprocating chain saw 12 for its cutting or topping operation wherein the full cutting cycle consists of an engagement stroke and retraction stroke.

In order to employ the present invention, a log skidder must drag a load of felled trees to a landing area near the tree delimbing and topping machine assembly 11. Next, the equipment operator uses the grapple 13 of a knuckle boom loader 14, which is connected to the tree delimbing and topping machine assembly 11 via two trailer frame members 16, to pick up one or more trees placing them in the cutter head assembly 17 of the tree delimbing and topping machine assembly 11.

The cutter head assembly 17 includes a rectangular support frame 18 with a pair of curved limb stripping blades 19 pivotally mounted thereon for movement toward and away from each other. The pivotal curved stripping blades 19 define a tree encircling stripping opening therebetween for longitudinal movement of a tree therethrough.

The curved stripping blades 19 are urged inwardly into tree encircling engagement with the tree trunk and are resiliently maintained in the proper relationship around the tree trunk as the diameter of the tree reduces or enlarges when the tree is drawn through the cutter head assembly.

The rectangular support frame 18 is pivotally mounted to the two trailer frame members 16 so as to provide vertical and horizontal movement. This movement allows the rectangular support frame 18 and curved stripping blades 19 to be pivotally aligned with the tree trunk, thus conforming to any angle the tree takes as the tree is drawn through the respective stripping opening.

In normal operation, the tree delimbing and topping machine assembly 11 tilts back and settles at an angle on its own.

After a tree has been placed in the cutter head assembly 17, the operator uses the grapple 13 of the knuckle boom loader 14 to draw the tree through the stripping opening whereupon he uses the topping saw 12 to remove the top from the tree. It is at this point where my invention is incorporated into this repeated process. It should be understood, however, that my invention may be utilized as a continuous lubricating system for any apparatus capable of driving its own lubrication pump.

Figure 2:
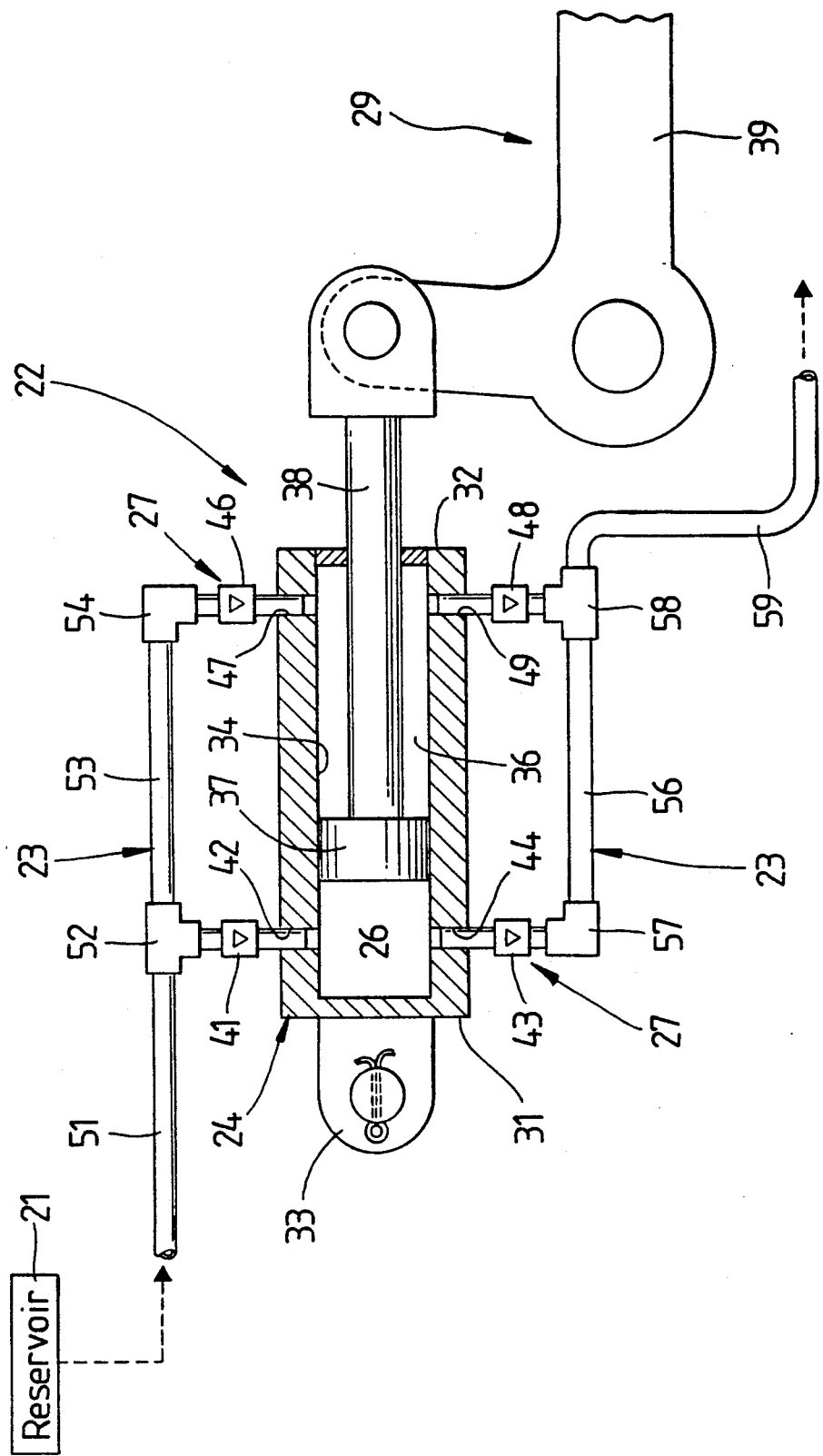
FIG. 2 is a sectional view of the present invention as it would be positioned in a tree delimbing and topping machine.

It may be seen in FIG. 2 that the present invention contemplates the use of a tank or reservoir 21 in which a quantity of lubricant (typically oil) is contained and made readily available. A pump assembly 22 is connected to the reservoir 21 via a lubricant conduit assembly for discharging or urging the lubricant from the reservoir 21 to the reciprocating chain saw 12. As employed in the present invention, the pump assembly 22 is comprised of a piston cylinder 24 and a piston 26 which together functionally cooperate in a novel manner to continuously facilitate the conveyance of lubricant from the reservoir 21 to the reciprocating chain saw 12. In addition, the present invention also utilizes a check valve assembly 27; a plurality of valve couplings 28; and a means 29 to reciprocate the piston 26.

The piston cylinder 24 is substantially cylindrical in shape having a connection end 31 and a tree delimbing and topping machine interface end 32 and is mounted on the tree delimbing and topping machine assembly 11 at its connection end 31 by a known method such as a clevis pin assembly 33 as shown in FIG. 2. The piston cylinder 24 further includes an internal surface 34 coaxially therein which defines a cylindrical chamber 36 coaxially therein for slidably encasing the piston 26.

The piston 26 is comprised of a plunger 37 for slidably and sealingly engaging the internal surface 34 of the piston cylinder 24 and a reduced cylindrical portion or piston rod 38 which allows lubricant to pass along the outer periphery thereof while it is temporarily encased within the piston cylinder 24. The piston rod 38 sealingly protrudes coaxially through the interface end 32 of the piston cylinder 24 and is operatively connected to the reciprocating means 29 which is part of the tree delimbing and topping machine assembly 11. The reciprocating means 29 in the present invention is an "L" shaped lever arm 39 that is connected to a saw actuator (not shown) which is part of the tree delimbing and topping machine assembly 11.

The function of the check valve assembly 27, which is comprised of a plurality of check valves (one-way valves) connected to and in fluid communication with the cylindrical chamber 36, is to provide a means for regulating the flow of lubricant from the reservoir 21 to the reciprocating chain saw 12.

The check valve assembly 27 is comprised of: a saw retraction intake check valve 41 which is connected to a port 42 extending through the piston cylinder 24 proximal its connection end 31; a saw engagement exhaust check valve 43 which is connected to a port 44 extending through the wall of the piston cylinder 24 proximal its connection end 31; a saw engagement intake check valve 46 which is connected to a port 47 passing through the wall of the piston cylinder 24 proximal its interface end 32; and a saw retraction exhaust check valve 48 which is connected to a port 49 passing through the wall of the piston cylinder 24 proximal its interface end 32.

The function of the lubricant conduit assembly 23, which is in communication with the pump assembly 22, is to provide a means for transporting the lubricant from the reservoir 21 to the reciprocating chain saw 12. The lubricant conduit assembly 23 is comprised of: a primary intake conduit 51 connected at one end to the reservoir 21 and connected at its opposite end to the saw retraction intake check valve 41 via a saw retraction intake valve coupling 52; a saw engagement intake conduit 53 connected at one end to the saw retraction intake valve coupling 52 and connected at its opposite end to the saw engagement intake check valve 46 via a saw engagement intake valve coupling 54; a saw engagement exhaust conduit 56 connected at one end to the saw engagement exhaust check valve 43 via a saw engagement exhaust valve coupling 57 and connected at its opposite end to a saw retraction exhaust valve coupling 58; and a primary exhaust conduit 59 connected at one end to the saw retraction exhaust check valve 48 via the saw retraction exhaust valve coupling 58 and mounted at its opposite end to the tree delimbing and topping machine assembly 11 a proximal distance from the reciprocating chain saw 12 for supplying lubricant thereto.

Figure 3:
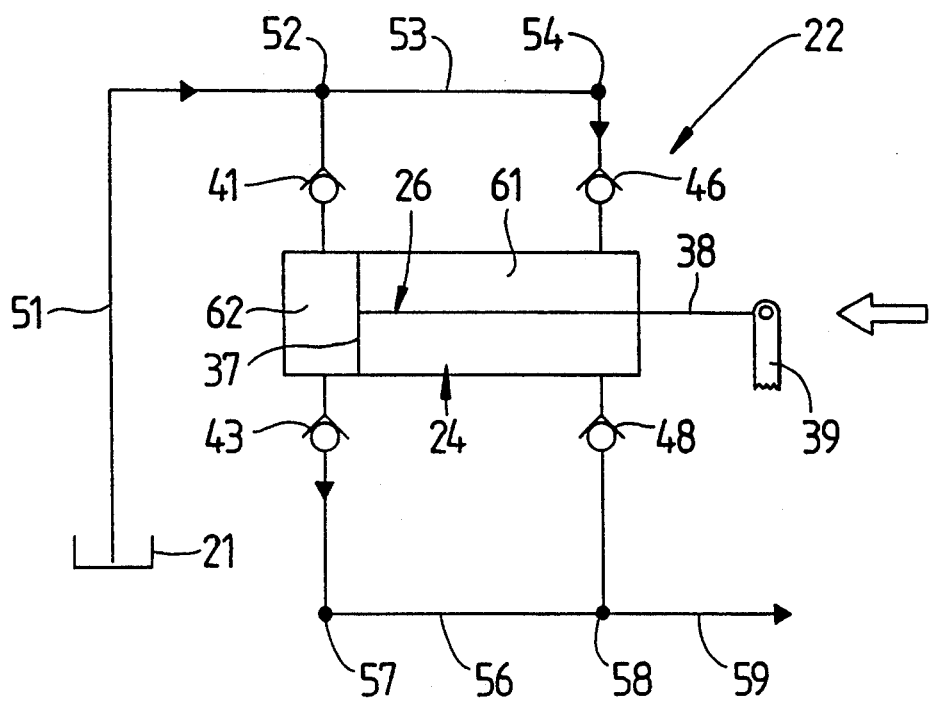
FIG. 3 is a schematic depiction of the present invention illustrating the flow path of lubricant during the chain saw's cutting or engagement stroke.
Figure 4:
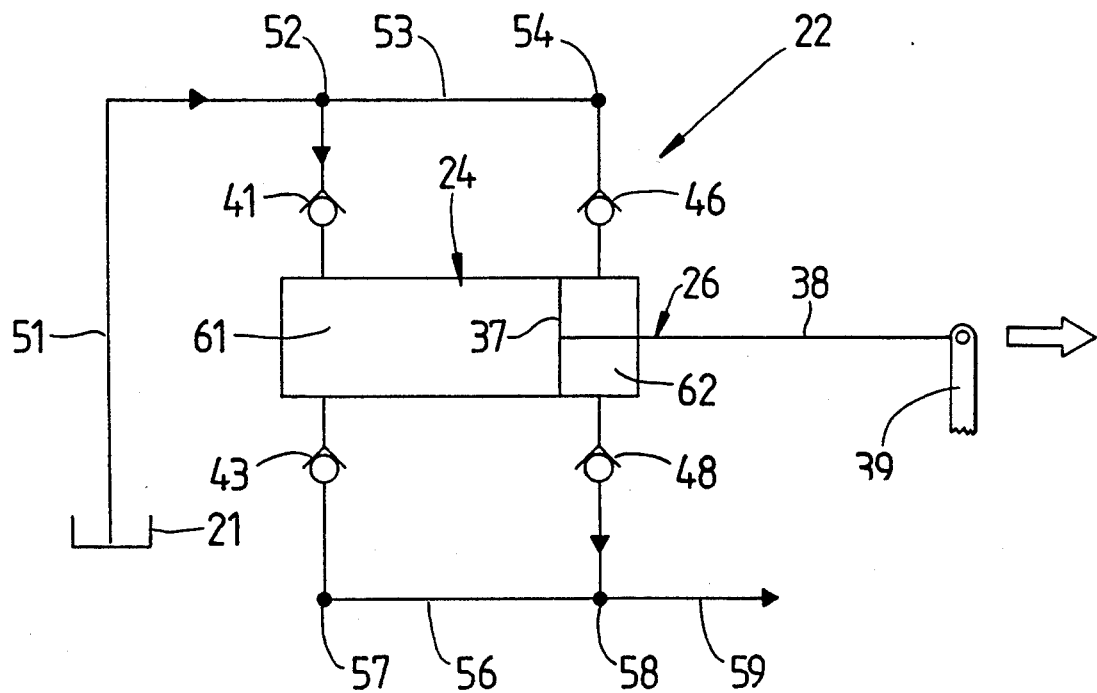
FIG. 4 is a schematic depiction of the present invention illustrating the flow path of lubricant during the chain saw's retraction stroke.

As shown in FIGS. 3 and 4, the pump assembly 22 provides two functions simultaneously. The cylindrical chamber 36 is divided by the plunger 37 into two chambers, each of which serve as a temporary receiving chamber 61 or discharge chamber 62 depending on the direction of axial movement of the piston 26 which corresponds to either the engagement or retraction stroke of the reciprocating chain saw 12. When the volume of the respective chamber is decreasing due to the movement of the plunger 37, it is characterized as a discharge chamber since the pressure increase will force the lubricant through one of the respective exhaust check valves 43 or 48. Simultaneously, however, the chamber opposite the temporary discharge chamber, in which the volume is increasing, is characterized as a receiving chamber since the resulting pressure decrease will draw lubricant into the chamber through one of the respective intake check valves 41 or 46. Hence, this coexisting dual function of the pump assembly 22 operates to continuously supply lubricant to the reciprocating chain saw 12 throughout the saw's engagement and retraction strokes.

METHOD OF OPERATION

As illustrated in FIG. 3, when the saw actuator displaces the reciprocating chain saw 12 into its cutting or engagement stroke, the "L" shaped lever arm 39 concurrently displaces the piston 26 in the piston cylinder 24 in the direction shown, forcing lubricant out of the temporary discharge chamber 62 through the saw engagement exhaust check valve 43 into the saw engagement exhaust conduit 56 and ultimately into the primary exhaust conduit 59 which transports lubricant to the reciprocating chain saw 12. At the same time, as illustrated in FIG. 3, lubricant is recharged into the temporary receiving chamber 61 through the primary intake conduit 51, saw engagement intake conduit 53, and saw engagement intake check valve 46.

Accordingly, as illustrated in FIG. 4, when the saw actuator displaces moving the reciprocating chain saw 12 into its retraction stroke, the "L" shaped lever arm 39 concurrently displaces the piston 26 in the piston cylinder 24 in the direction shown, forcing lubricant out of the temporary discharge chamber 62 through the saw retraction exhaust check valve 48 and into the primary exhaust conduit 59 which transports lubricant to the reciprocating chain saw 12. At the same time, as illustrated in FIG. 4, lubricant is recharged in the temporary receiving chamber 61 through the primary intake conduit 51 and saw retraction intake check valve 41.

Therefore, the present invention guarantees continuous flow of lubricant to the saw whenever the saw is engaged or retracted.

While a preferred embodiment of the present invention has been described in detail, such description is for illustrative purposes only, and it is to be understood that changes and variations may be made without departing from the spirit or scope of the following claims.

Having set forth the nature of the present invention, what is claimed is:

1. A chain saw lubricating system employed in a tree sawing machine for continuously lubricating a reciprocating chain saw throughout its cutting and retraction strokes, said chain saw lubricating system comprising:
    (a) a lubricant reservoir for containing a quantity of lubricant;
    (b) means for continuously urging said lubricant from said lubricant reservoir to said reciprocating chain saw during both the cutting and retraction strokes of said reciprocating chain saw, said continuous urging means responsive to the cutting and retraction strokes of said reciprocating chain saw;
    (c) means for transporting said lubricant from said lubricant reservoir to said reciprocating chain saw via said continuous urging means; and
    (d) means for regulating the flow of said lubricant within said transporting means and said continuous urging means, said regulating means connected to and in fluid communication with said continuous urging means.

2. A chain saw lubricating system employed in a tree sawing machine for continuously lubricating a reciprocating chain saw throughout its cutting and retraction strokes, said chain saw lubricating system comprising:
    (a) a piston cylinder having a connection end and a sawing machine interface end, said piston cylinder secured at said connection end to said sawing machine by a clevis connection, said piston cylinder further having an internal surface which defines a cylindrical chamber coaxially therein:
    (b) a piston sealingly encased coaxially within said cylindrical chamber, said piston having a plunger for slidably and sealingly engaging said internal surface of said piston cylinder and a piston rod integrally connected at one end to said plunger for allowing lubricant to pass along the outer periphery thereof, said piston rod sealingly protruding through said interface end of said piston cylinder;
    (c) means for continuously reciprocating said piston responsive to the cutting and retraction strokes of said reciprocating chain saw connected to said piston rod distal said integral connection to said plunger;
    (d) a lubricant reservoir for containing a quantity of lubricant;
    (e) means for transporting said lubricant from said lubricant reservoir to said reciprocating chain saw via said piston cylinder; and
    (f) means for regulating the flow of said lubricant within said transporting means and said piston cylinder, said regulating means connected to and in fluid communication with said cylindrical chamber of said piston cylinder.

3. A continuous chain saw lubricating system as specified in claim 2 wherein said continuous reciprocating means is an "L" shaped lever arm operatively connected to said sawing machine.

4. A continuous chain saw lubricating system as specified in claim 3 wherein said cylindrical chamber is divided by said plunger into co-functioning alternating receiving and discharge chambers, the designation of said chambers contingent upon the direction of axial displacement of said piston wherein a pressure increase defines said discharge chamber and a pressure decrease defines said receiving chamber, said axial displacement of said piston operatively responsive to the cutting and retraction strokes of said chain saw.

5. A continuous chain saw lubricating system as specified in claim 4 wherein said transporting means comprises a plurality of lubricant conduits connected to and in fluid communication with said lubricant reservoir and said cylindrical chamber of said piston cylinder.

6. A continuous chain saw lubricating system as specified in claim 5 wherein said flow regulating means comprises a plurality of check valves each connected at one end to said cylindrical chamber and connected at the opposite ends to respective said plurality of lubricant conduits.

7. A continuous chain saw lubricating system as specified in claim 6 wherein said plurality of check valves comprise:
    (a) a saw retraction intake check valve in fluid communication with said cylindrical chamber proximal said connection end of said piston cylinder;
    (b) a saw engagement exhaust check valve in fluid communication with said cylindrical chamber proximal said connection end of said piston cylinder;
    (c) a saw engagement intake check valve in fluid communication with said cylindrical chamber proximal said interface end of said piston cylinder; and
    (d) a saw retraction exhaust check valve in fluid communication with said cylindrical chamber proximal said interface end of said piston cylinder.

8. A continuous chain saw lubricating system as specified in claim 7 wherein said plurality of lubricant conduits comprise:
    (a) a primary intake conduit connected at one end to said lubricant reservoir and connected at the opposite end to said saw retraction intake check valve;
    (b) a saw engagement intake conduit connected at one end to said saw retraction intake check valve and connected at the opposite end to said saw engagement intake check valve;
    (c) a saw engagement exhaust conduit connected at one end to said saw engagement exhaust check valve and connected at the opposite end to a saw retraction exhaust valve; and
    (d) a primary exhaust conduit connected at one end to said saw retraction exhaust check valve and mounted at the opposite end to said sawing machine proximal said reciprocating chain saw for introducing lubricant onto said reciprocating chain saw.

9. A system for lubricating a saw comprising:
    (a) means for continuously urging a quantity of lubricant to said saw during operation thereof;
    (b) means for transporting said lubricant to said saw; and (c) means for regulating the flow of said lubricant within said transporting means, said regulating means connected to and in communication with said continuous urging means.

10. A system for lubricating a saw comprising:
(a) a piston cylinder having an internal surface which defines a cylindrical chamber therein;
(b) a piston sealingly encased within said cylindrical chamber comprising a plunger and a piston rod, said piston rod protruding through one end of said piston cylinder;
(c) means for continuously reciprocating said piston connected to said piston rod, such that a quantity of lubricant is continuously urged from said cylindrical chamber of said piston cylinder during operation of said saw;
(d) means for transporting said lubricant from said cylindrical chamber of said piston cylinder to said saw; and
(e) means for regulating the flow of said lubricant within said transporting means, said regulating means connected to and in communication with said cylindrical chamber of said piston cylinder.

11. A system as specified in claim 10 wherein said cylindrical chamber simultaneously receives and discharges lubricant responsive to displacement of said piston.

12. A system as specified in claim 11 wherein said flow regulating means comprises a plurality of check valves connected to and in fluid communication with said cylindrical chamber.

13. A system as specified in claim 12 wherein said transporting means comprises a plurality of lubricant conduits connected to and in fluid communication with said plurality of check valves.

14. A method for continuously lubricating a reciprocating chain saw that is employed in a sawing machine during its cutting and retraction strokes comprising the steps of:
(a) axially displacing a piston within a piston cylinder thereby withdrawing a quantity of lubricant from a lubricant reservoir into a receiving chamber defined in said piston cylinder via a plurality of lubricant conduits;
(b) simultaneously discharging a quantity of lubricant from a discharge chamber defined in said piston cylinder to said reciprocating chain saw via said plurality of lubricant conduits.

* * * * *